March 18, 1924.  
G. W. BOWER  
1,487,311  
CURRENT COLLECTOR FOR ELECTRIC VEHICLES  
Filed Nov. 18, 1921  
2 Sheets-Sheet 1
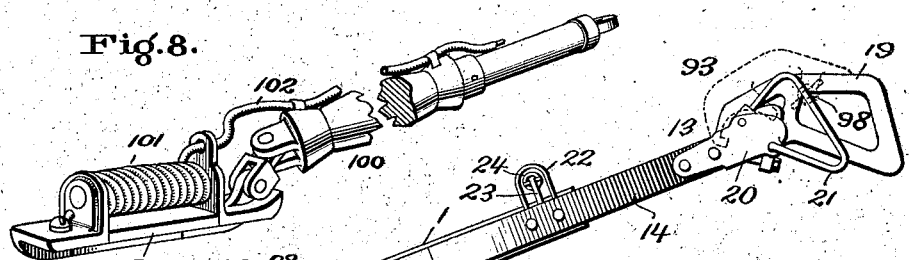
Fig. 8.  Fig. 1.  Fig. 2.
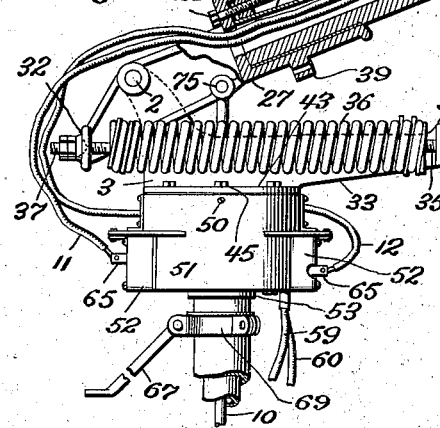
Fig. 3.  Fig. 4.
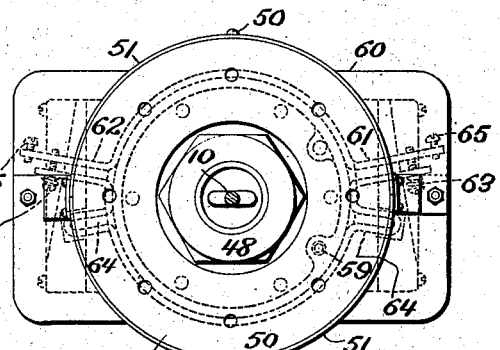
Inventor:  
George W. Bower,  
by Albert E. Davis  
His Attorney.

March 18, 1924.
G. W. BOWER
1,487,311
CURRENT COLLECTOR FOR ELECTRIC VEHICLES
Filed Nov. 18, 1921   2 Sheets-Sheet 2
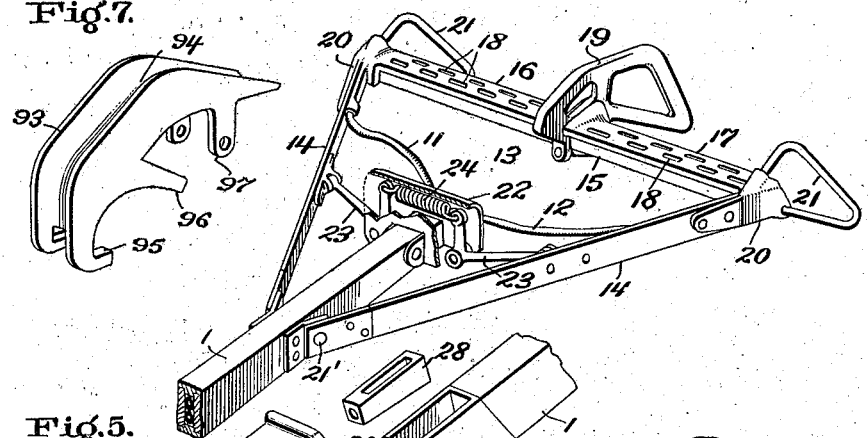
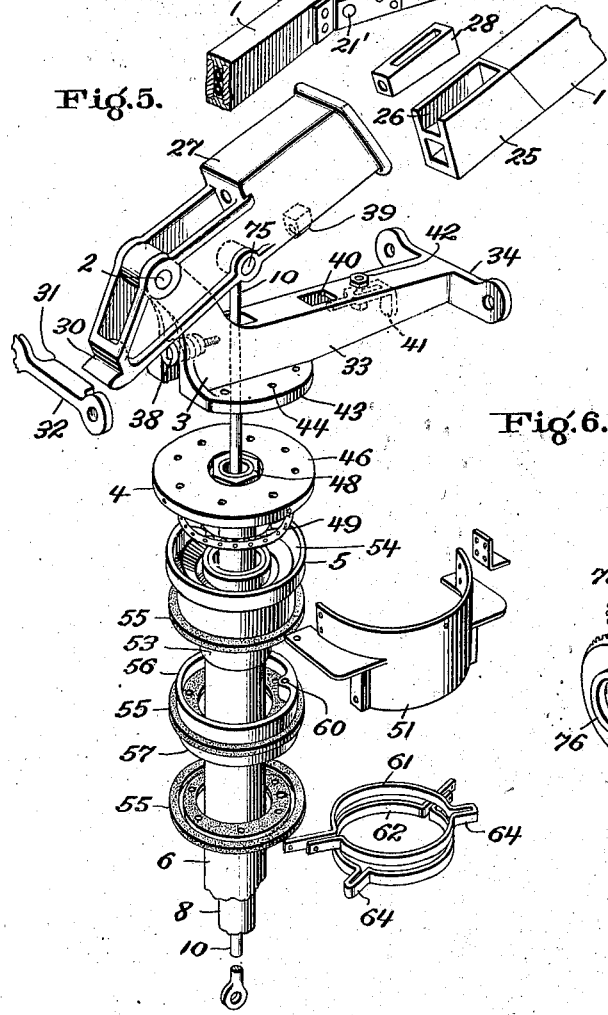
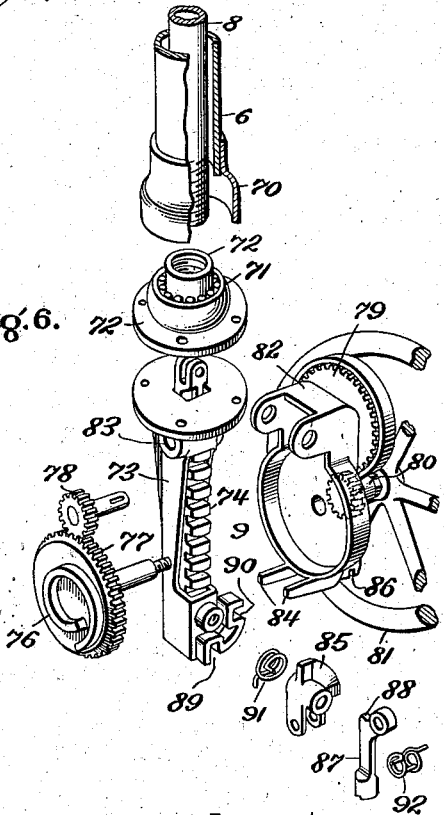
Inventor:
George W. Bower
by *Albert G. Davis*
His Attorney, Patented Mar. 18, 1924.

1,487,311

UNITED STATES PATENT OFFICE.

GEORGE W. BOWER, OF SCHENECTADY, NEW YORK, ASSIGNOR TO GENERAL ELECTRIC COMPANY, A CORPORATION OF NEW YORK.

CURRENT COLLECTOR FOR ELECTRIC VEHICLES.

Application filed November 18, 1921. Serial No. 516,094.

*To all whom it may concern:*

Be it known that I, GEORGE W. BOWER, a citizen of the United States, residing at Schenectady, county of Schenectady, State of New York, have invented certain new and useful Improvements in Current Collectors for Electric Vehicles, of which the following is a specification.

The present invention relates to electrical propulsion of street vehicles and more especially to trackless trolley systems in which the vehicle makes connection with supply wires suspended above and along the highway and in which there are no tracks or other means for defining the course of the vehicle.

During recent years the high cost of materials and labor has prevented street railway companies from extending their permanent rights of way at the same rate that urban populations have tended to spread out. The gasoline-driven busses were thought formerly to be adapted to caring for this relatively light traffic, at least as feeders to the main street railway systems, but on account of their unreliable performance and the high cost of motive power and upkeep, they have not, as a rule, been found satisfactory to the travelling public or profitable to the operators. Electric propulsion has been recognized as much more satisfactory and cheaper than gasoline propulsion, but electric vehicles of the trackless type, as heretofore constructed, have not been well adapted to one man operation, which is regarded as necessary from the standpoint of economic operation of a vehicle of relatively small passenger capacity.

The object of my invention is to provide an improved trolley structure and operating means therefor which the driver of a trackless vehicle provided therewith may raise and lower and otherwise maneuver with facility and safety without leaving his usual station at the front end of the vehicle, which will maintain operative relation with a pair of overhead wires with the vehicle moving along a path considerable distance to either side of the vertical plane of the wires and which may be adapted with facility to operate in conjunction with the single conductor wire of the usual street railway system.

One embodiment of the invention is shown in the accompanying drawings in which Fig. 1 is a side elevation, with parts broken away, of a trolley pole, base and operating means; Fig. 2 is a top plan of the base and electrical connections; Fig. 3 a part elevation and part vertical section of the same; Fig. 4 is an end elevation of the operating gear; Fig. 5 is an exploded view of the trolley pole, base and support; Fig. 6 is a similar view of the operating gear; Fig. 7 is a perspective view of an adapter shoe for use with a single overhead wire, and Fig. 8 is a side elevation of a grounding or track shoe for use in conjunction with the adapter shoe.

As shown in Figs. 1, 3 and 5, the trolley pole 1 is pivoted for up and down movement on a transverse shaft 2 carried by a base bracket 3 bolted to a base plate 4 mounted for movement about the vertical axis on a thrust ring 5 fixed to the upper end of a stationary hollow post 6 extending through the car roof 7 and within which is a hollow shaft 8 connected at its upper end with the base plate 4 and carrying at its lower end the operating gear 9 which is also connected with the trolley pole 1 by a link 10 passing freely through the hollow shaft 8.

The trolley pole 1 is, for the sake of lightness, made of wood, either in one piece or in strips, with an axial channel for the passage therethrough of the insulated conductors or lead wires 11 and 12 from the head 13 to the base. The head 13 is made in the shape of a triangular frame having diagonal braces 14 and horizontal bar 15 of wood or other insulating material, the latter of which has a length more than twice the space between the pair of trolley wires (not shown) suspended along the highway. The horizontal bar 15 carries on its upper surface two independent metal collector plates or shoes 16 and 17 with pockets 18 thereon for the reception of solid lubricating matter such as tallow and graphite, and between their adjacent ends is disposed an insulating barrier or spacer bracket 19 which operates to prevent both trolley wires coming in contact with either shoe at the same time and becoming short circuited thereby. By reason of the trolley head having no metal part long enough to bridge the space between the trolley wires, the matter of maneuvering the trolley into place and operating it even at an obtuse angle to the wires is rendered safe. At the outer ends of the colelctor plates or shoes 16 and 17 are formed brackets 20 with fender loops 21 extending above and beyond the operative surface of the shoes. To the lower ends of the brackets 20 the insulated conductor wires 11 and 12 are attached as shown in Fig. 5. In order that the collector head 13 may readily respond to variations in the elevation of the trolley wires independent of the inertia of the poles, the former is hinged to the latter at 21' a short distance below its outer end and at its end a guard bracket 22 is attached and having pivoted thereto two transverse bell cranks 23 with their short arms connected by a tension spring 24 while their long arms are respectively pivoted to the inner sides of the divergent braces 14. The lower end of the pole 1 is provided with a metal casing 25 having a pocket 26 formed in the upper edge. This encased end of the pole is adapted to be received in a socket formed in the end of a cast metal hinge member 27 and secured thereto by a longitudinally movable wedge 28 actuated by a lead screw 29. The lower end of the pole hinge member 27 is bifurcated for the free passage of the forward end of the base 3, while the tip thereof is provided with a transverse V slot 30, in which the knife edge 31 of a spring thrust bar 32 is fulcrumed.

The base 3 has a hollow rearwardly extending arm 33 provided at its outer end with a T head 34 while its forward end, carrying the hinge shaft 2 of the pole, extends upwardly. The ends of the T head 34 are pierced for the passage of bolts 35 connected respectively to the rear ends of powerful tension springs 36 while the forward ends thereof are connected to the pierced ends of the thrust bar 32 by bolts 37. In the front end of the bracket is a buffer spring 38 arranged to engage the lower end of the hinge member 27 of the pole in case the latter should escape the trolley wires and fly upwardly. In order that the pole may be locked in depressed position, as during shipment or repair, the hinge member 27 is provided at its under side with an ear 39 adapted to pass through a hole 40 in the bracket 3 and the latter has on its inner wall a sliding bolt 41 adapted to be moved forward into engagement with the ear 39 and clamped by tightening of the nut 42. At its lower edge the base 3 is provided with transverse flanges 43 in which are rows of holes 44 for bolts 45 by which it is fixed to the base plate 4.

The base plate 4 is of the nature of a turn table by which the trolley structure is adapted to swing back and forth about a vertical axis and consists of a disk-shaped top 46 with a hub sleeve 47 internally threaded for engagement with the upper end of the hollow shaft 8 and to which it is locked against relative rotation therein by a nut 48. Concentric with the hub sleeve 47 it has a conical step bearing surface adapted to engage and ride upon a cage of tapered rollers 49. Depending from the periphery of the plate 4 and attached thereto by set screws 50 is a split cylindrical guard 51 of sheet metal with two opposite side notches provided in its lower end for the reception of insulation blocks 52.

The thrust ring 5 has a hub sleeve 53 internally threaded for fixed engagement with the upper end of the stationary tubular post 6. In the upper surface of the ring is formed a concentric channel 54, the mid portion of which is formed into a conical step bearing surface upon which the cage of rollers 49 is supported while the spaces on either side thereof serve as grease retainers. About the outer surface of the hub sleeve 53 and concentric therewith are three insulating washers 55 which have between them and insulated thereby two contact rings 56 and 57 and clamped in place by bolts 58 tapped into the under side of the thrust ring. These contact rings have connected respectively to their inner walls insulated conductor wires 59 and 60 which lead to the electric motor and lighting circuits of the vehicle in the usual way.

In sliding engagement with the outer peripheries of the rings 56 and 57 are contact bands 61 and 62, each having its ends turned outwardly and adjustably and yieldably fastened together by a tangent screw 63 having a spring surrounding its shank and pressing against the adjacent end of the band, while at a point diametrically opposite the bent out ends each band has formed therein a thrust projection or loop 64. One of the outturned ends of each band is provided with a binding screw 65 for connecting an end of the respective conductor wires 11 and 12 therewith. In order to insure that the bands 61 and 62 rotate with the trolley about its vertical axis without binding thereon the outwardly bent ends of each band and its thrust projection or loop 64 are disposed in mortises formed in the oppositely disposed insulating blocks 52.

The stationary hollow post 6 passes through the car roof, indicated at 7 in Fig. 1, and is rigidly secured in place by a roof collar 66 and a number of steady braces 67 connected thereto above and below the roof by collars 68 and 69 and the outer ends of which are adapted to be bolted to distributed points in the car roof. At the lower end of the post 6 is clamped a bell-shaped shell 70 in which is positioned the outer race of a cylindrical roller bearing 71.

The hollow shaft 8 being carried by the base plate 4 its upper end is held in axial position thereby while its lower end has screw threaded thereon a flanged collar 72 which is held in axial position by the roller bearing 71. The flanged collar 72 has rigidly bolted thereto the frame 73 of the operating gear 9.

The operating gear 9 is carried by a vertical frame 73 having a vertical channel in which is guided a toothed rack 74 connected to the lower end of the link 10 which is connected at its upper end thereof at 75 to the socket piece 27 of the trolley pole. The means for drawing down the rack 74 and with it the trolley pole in opposition to the tension of the powerful springs 36 comprises a spiral hoop gear 76 driven through double reduction spur gears 77, 78, 79 and 80 from a hand wheel 81, and in order that the spiral hoop gear may be readily moved out of the path of the toothed rack 74 to permit the latter to play up and down freely while the trolley head is in operative engagement with the trolley wires, it and its operating gears are mounted on a pendulum bracket 82 pivoted at 83 near the upper end of the vertical frame 73 and provided at its lower end with guide fingers 84 which embrace opposite sides of the frame 73, the means for causing the bracket 82 to swing outwardly comprises a helical cam 85 pivoted near the lower end of the frame 73 and engaging in a notch 86 at the lower end of the bracket. It is actuated by a handle 87 pivoted thereto and provided with a heel 88 adapted to engage, in each extreme position, with one or other of the notches 89 and 90 formed at the ends of a quadrant in the lower end of the frame 73 and thereby latch the cam 85 in such extreme position. The cam is engaged by a biasing spring 91 normally tending to move it into rack-engaging position and the handle 87 is engaged by a biasing spring 92 normally tending to move it outwardly with its heel 88 tending to move into latching position.

When it is desired to engage the trolley head with the trolley wires, the operator by exerting torque on the operating wheel in a horizontal direction causes the trolley to swing sidewise about the vertical axis of the base until it is directly beneath them and then by rotating the hand wheel 81 permitting the rack 74 to back off and the trolley to rise under the recoil of its springs 36 until its head contacts with the trolley wires. The gear releasing handle 87 is then pulled forward and thrown around to the horizontal position causing spiral cam 85 to move the pendulum bracket 82 backwardly and freeing the spiral hoop 76 from the path of the toothed rack 74. When it is desired to lower the trolley, the spiral hoop and rack are brought into engagement and the operating wheel 81 rotated in the opposite direction. In case it is desired to secure the trolley pole in its lowered position, the wheel 81 is turned until the socket member 27 is brought to its lowest position and the locking bolt 41 is shot home.

While the normal field of operation of a trackless trolley car is on streets not equipped with track rails or the common single trolley wire, it is often necessary to provide such cars with means whereby they may operate in the customary manner of street cars running on tracks and receiving current from a single overhead wire, as in the case of getting the car to and from a car barn located at some distance from the point of juncture of the two systems. I accordingly provide a detachable contact shoe 93 (see Figs. 1 and 7) adapted to be seated astride the insulating spacer bracket 19 and comprising a metal casting with its upper surface provided with a groove 94 adapted to make sliding engagement in well known manner with a single trolley wire and its frogs and crossovers, and with its lower side provided with claws 95 and 96 adapted to rest upon and make good contact with both collector shoes 16 and 17 and with two ears 97 for the reception of a bolt 98 adapted to pass through the spacer bracket 19 to secure the shoe thereon. In order to make a good ground connection for the return circuit, a track shoe as shown in Fig. 8 is provided beneath the car and normally latched in elevated position but capable of being lowered into contact with the track rail whenever the temporary contact shoe 93 is to be used. The track shoe comprises a short metal block 99 adapted to slide along the top of a track rail and provided at one end with a hinge connection to a double jointed draft rod 100. In order to insure good contact between track and shoe, the latter is provided with a magnetizing coil 101 in the end of the circuit wire 102 from the car motor.

When the track shoe is used the trolley return circuit wire will be switched out by the usual disconnecting means on the car.

While I have shown and described the best embodiment of the invention known to me, I do not desire to be restricted thereto.

What I claim as new and desire to secure by Letters Patent of the United States, is—

1. The combination with a pivoted trolley pole, of yielding pressure means tending to turn said pole on its pivot, manually driven power means for moving said pole in opposition to said yielding pressure means, and means for connecting and disconnecting said power means with and from said trolley pole.

2. The combination with a pivoted trolley pole arranged to be mounted on the roof of a vehicle, yielding pressure means located above the roof and tending to turn the pole on its pivot, manually driven power means located below the roof for moving the pole in opposition to the yielding pressure means, and means also below the roof for connecting and disconnecting said power means with and from said trolley pole.

3. The combination with a pivoted trolley pole, a support for the pole arranged to be mounted on the roof of a vehicle, yielding pressure means carried by the support and attached to the pole for lifting its upper end, a member which is attached to the pole and extends downward through the support and the roof, manually actuated means located below the roof which co-operate with the member for moving the pole in opposition to the yielding pressure means, and other means also below the roof for connecting and disconnecting said manually actuated means with and from said member.

4. The combination with a pivoted trolley pole, of yielding pressure means tending to turn said pole on its pivot, rack and gear power means for moving said pole in opposition to said yielding pressure means, and means for freeing and bringing together said rack and gear power means.

5. The combination with a pivoted trolley pole, of yielding pressure means tending to turn said pole on its pivot, a rack connected to move with said pole, a hoop gear adapted to engage said rack and move said pole in opposition to said yielding pressure means, and means for freeing and bringing together said hoop gear and said rack.

6. The combination with a pivoted trolley pole, of yielding pressure means tending to turn said pole on its pivot, a rack connected to move with said pole, power gearing for actuating said rack, and a pivoted bracket supporting said power gearing and adapted to carry it into and out of operative engagement with said rack.

7. The combination with a pivoted trolley pole, of yielding pressure means tending to turn said pole on its pivot, a rack connected to move with said pole, power gearing for actuating said rack, a pivoted bracket supporting said power gearing, and means to move said bracket on its pivot to carry said gearing into and out of engagement with said rack.

8. The combination with a pivoted trolley pole, of yielding pressure means tending to turn said pole on its pivot, a rack connected to move with said pole, a guide frame for said rack, power gearing for actuating said rack, a bracket supporting said power gearing and pivoted at one end on said guide frame, and means between said guide frame and the other end of said bracket for moving the latter back and forth and holding it in extreme position.

9. The combination with a pivoted trolley pole, of yielding pressure means tending to turn said pole on its pivot, a rack connected to move with said pole, a guide frame part for said rack, power gearing for actuating said rack, a bracket part supporting said power gearing and pivoted at one end on said guide frame part, a spiral cam mounted on one of said parts and operatively engaging the other, and means for locking said spiral cam in extreme position.

10. The combination with a pivoted trolley pole, of yielding pressure means tending to move said pole on its pivot, a base for said pole movable on a vertical axis, rack connected to move with said pole, power gearing movable into and out of engagement with said rack, and a hand part carried by said base adapted to actuate said power gearing and rack to control the pivotal movements of said pole and to actuate said support to control the side movements of said pole.

11. The combination with a pivoted trolley pole, of yielding pressure means tending to move said pole on its pivot, a base for said pole movable on a vertical axis, a rack connected to move up and down with said pole, a guide frame for said rack rigidly connected to said base, a bracket pivoted to said guide frame on a transverse axis, power gearing and a hand wheel therefor carried by said bracket, and means for swinging said bracket on its pivot and fixing it in extreme position.

12. The combination with a trolley base, of a stationary support in which said base is journalled, contact rings concentrically connected through insulation to said support, insulating blocks secured to said base, and slip contact bands supported by said insulating blocks in contact with said rings and each band provided with a thrust projection.

In witness whereof, I have hereunto set my hand this 17th day of November, 1921.

GEORGE W. BOWER.